Aug. 11, 1953 O. I. STEIGERWALT ET AL 2,648,804

MULTIPLE ELEMENT CIRCUIT COMPONENTS

Filed Feb. 1, 1951

Inventors
Oliver I Steigerwalt
Howard I Osbry
By
Ralph Hamman
Attorney

Patented Aug. 11, 1953

2,648,804

UNITED STATES PATENT OFFICE 2,648,804

MULTIPLE ELEMENT CIRCUIT COMPONENTS

Oliver I. Steigerwalt and Howard I. Oshry, Erie, Pa., assignors to Erie Resistor Corporation, Erie, Pa., a corporation of Pennsylvania Application February 1, 1951, Serial No. 208,954

1 Claim. (Cl. 317—101)

This invention is intended to produce a multiple circuit component in which a unitary composite ceramic plate or other suitably shaped support is coated with various combinations of resistance, inductance and condenser elements. The plate includes areas with properties adapted to the overlying coatings and areas with properties for decreasing coupling between adjacent coatings, or in the case of resistance elements, areas for decreasing the distributed capacity. Since the plate is unitary, it can, after firing, be processed in the same manner as a plate of uniform properties throughout the entire area where the properties would not be suitable for all of the elements and where there could be objectionable coupling between adjacent elements and objectionable distributed capacity in resistance elements. The fabrication of the composite plate involves loading of unfired materials of different properties into the corresponding areas and then firing the composite plate to produce a unitary plate which thereafter can be handled as a unit. The coatings for the various elements are applied by the usual techniques.

Figure 1:
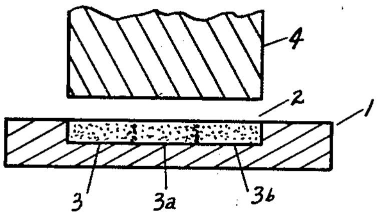
Figure 2:
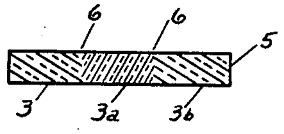
Figure 3:
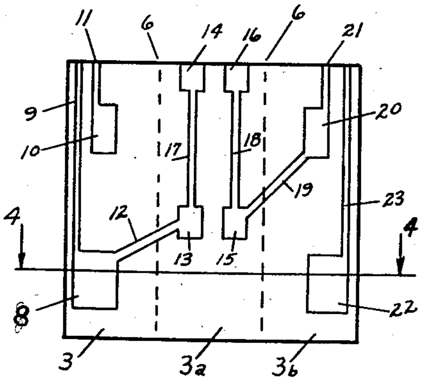
Figure 4:
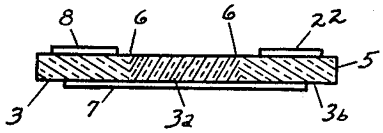
Figure 5:
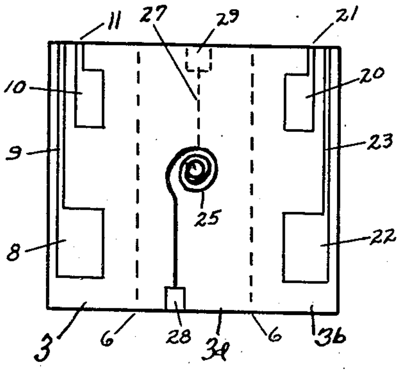

In the accompanying drawing, Fig. 1 is a diagrammatic section through a mold for forming a composite ceramic plate with adjacent or contiguous areas of different electric properties, Fig. 2 is a section through the plate made by the Fig. 1 mold, Fig. 3 is a top plan of a multiple element electric circuit component from the Fig. 2 plate, Fig. 4 is a section on line 4—4 of Fig. 3, and Fig. 5 is a top view of a similar electric circuit component in which a material of different electric properties has been substituted for one of the areas of the Fig. 2 plate.

In the so-called "printed circuit" technique multiple element circuit components have been applied as coatings to a base or support of insulating material. This technique has encountered serious limitations, because the support could not have electrical properties suitable for all of the desired electric circuit elements. Because of this limitation, recourse has been had to mounting separately manufactured electric circuit elements on the base, thereby destroying a great many of the advantages of the printed circuit.

By using a base or support constructed in accordance with the present invention, a unitary base is obtained, which can be handled during the coating operations in the same manner as a homogeneous base and yet the electrical properties of the various areas of the base to be coated correspond to the desired electrical properties for the circuit elements.

In Fig. 1 there is shown a mold 1 having a cavity 2, which is filled with contiguous masses 3, 3*a* and 3*b* of ceramic materials of different electric properties. After filling the mold cavity 2 a plunger 4 is lowered to compact the material and to produce a composite plate with the masses 3, 3*a*, and 3*b* in non-overlapping edgewise relation and in edge to edge contact, which upon firing results in the plate 5 shown in Fig. 2. After the pressing the composite plate is handled during the subsequent firing operating in the same manner as a ceramic plate made from a single material. In the fired plate, the material 3*a* is integrally united with the boundary materials 3 and 3*b*, there being zones 6 at the adjoining boundaries, in which there is sufficient intermingling of the material during firing to produce a unitary fired ceramic structure.

The plate is shown as having three strips, or areas of materials of different electrical properties. The shape of the areas and the materials used in the respective areas will of course vary with the desired electrical properties in the finished ceramic plate. Also the shape of the ceramic plate whether flat or curved depends upon the desired shape of the finished component. Entirely by way of example, the materials 3 and 3*b* may be high dielectric constant materials, such as barium titanate and the material 3*a* may be a low dielectric constant material such as barium magnesium titanate of suitable composition or a high permeability material such as ferrite ($Fe_2O_3XO$ where X is a bivalent metal). Barium titanate, which can have a dielectric constant of several thousand is suitable for forming condensers by applying conducting coatings to opposite faces thereof. Barium titanate is not suitable for applying a printed or coated resistor because the high dielectric constant results in too much distributed capacity. Barium titanate is also not always suitable for forming printed inductances because its magnetic permeability is substantially that of air and its high dielectric constant results in too high a distributed capacity in the printed inductance. Also where adjacent condensers are to be applied to a barium titanate area there will be capacitative coupling between the adjacent condensers, which in some cases may be objectionable. Barium magnesium titanate with a dielectric constant of 10–50 is not as suitable for high capacity condensers, but it is a suitable support for printed resistance coatings. The relatively low dielectric constant keeps the distributed capacity within tolerable limits. The low permittivity titanate is not always suitable for printing inductance elements because its permeability is of the order of 1. Ferrites, which have a magnetic permeability of several hundred, are more suitable for printing inductances. The dielectric constant of the ferrite materials is subject to wide variation and can be either low or high as desired.

In the multiple element circuit component shown in Fig. 3 there is a metallized coating 7 applied to practically the entire underside of the ceramic plate 5 covering the greater part of the areas 3 and 3*b*, and some part of the area 3*a*. On the upper side of the area 3 there is a condenser coating 8 and a coating 9 forming a lead to the condenser, a condenser coating 10 and a coating 11 forming a lead.

Extending from the coating 8 there is a coating 12 forming a connection from the coating 8 to a metal coating 13 forming one terminal of a resistor. The coating 12 extends from the area 3 over onto the area 3*a*, but since the upper surface of the ceramic plate is continuous the coating is applied in the same manner as though the ceramic plate were made of a single material. The area 3*a* also includes metal terminal coatings 14, 15 and 16 for a pair of resistors 17 and 18 and there is a coating 19 extending from the metal coating 15 over to a metal coating 20 on the area 3*b*. The metal coating 20 also has a coating 21 which serves as a lead for the condenser. Also on the area 3*b* is a metal coating 22 and a coating 23 serving as a lead therefor. The coatings 8 to 16 and 19 to 23 can be applied in any suitable manner. One convenient method of applying these coatings is by means of a silver paint, which after application is fired to produce a metallized coating, on the ceramic. If the firing technique is used, the resistors 17 and 18 will be applied as resistance coatings between the terminals 13 to 16, inclusive after the metallized coatings have been applied. This being necessary to prevent destruction of the resistor during the silver firing. In the completed circuit component, there are pairs of condensers 8, 10 and 20, 21 on the areas 3 and 3*b* and pairs of resistors 17 and 18 on the area 3*a*. Because of the low dielectric constant of the area 3*a* as compared to the areas 3 and 3*b* there will be essentially no coupling between the condensers 20, 22 across to the condensers 8, 10. Also because of the low dielectric constant of the area 3*a* there will be little distributed capacity to the resistors 17, 18 and the resistor terminals 13—16.

In Fig. 4 is shown another multiple element electric circuit component which differs from the Fig. 3 component merely in the substitution of a high magnetic permeability material such as a ferrite for the steatite occupying the area 3*a* in Figs. 1 to 4 inclusive. The area occupied by the ferrite material is indicated by the reference numeral 3*d*. All other parts of the component, which are the same as in the Figs. 1 to 4 construction indicated by the same reference characters. In the Fig. 5 component, there is an inductance applied to the high magnetic permeability area 3*d* in the form of a spiral metal coating 25 having metal leads 26, 27 leading to metal coating terminals 28 and 29. If the ferrite material in the area 3*d* has a low dielectric constant compared to the high dielectric areas 3 and 3*b* the condensers on areas 3 and 3*b* will be decoupled as in the Figs. 1 to 4 component. As in the Figs. 1 to 4 construction, the ceramic plate can be handled in the same manner as a plate made from a single material, since the ceramic materials having different electric properties are united into a unitary composite plate.

By having a unitary fired composite plate with areas having electrical properties adapted to the electric circuit elements to be formed by overlying coatings, the multiple element components can be made more compact and can have better electrical properties than components made with a base or support of a single homogeneous material.

What we claim as new is:

A multiple element printed circuit component comprising a composite unitary fired ceramic plate of uninterrupted coherently united masses of the ceramic and having opposite faces adapted to receive a plurality of printed coatings forming electric circuit impedance elements having properties determined by the electrical properties of the underlying ceramic, said plate comprising a plurality of masses of ceramic of different electrical properties in edgewise relation fired together to make the unitary composite plate, each mass extending contiguously between the opposite faces of the plate and forming a portion of the area of each of said opposite faces and adjoining masses being in non-overlapping relation and of different electrical properties and united by the intermingling which accompanies firing at the region in which the masses are in edgewise contact, and a plurality of coatings printed on the plate on areas respectively corresponding to the different masses of ceramic and forming electric impedance elements having properties determined by the electrical properties of the respective coating and the underlying ceramic.

OLIVER I. STEIGERWALT.
HOWARD I. OSHRY.

References Cited in the file of this patent

UNITED STATES PATENTS

| Number | Name | Date |
|---|---|---|
| 2,464,377 | Cohen | Mar. 15, 1949 |
| 2,549,424 | Carlson | Apr. 17, 1951 |
| 2,566,666 | Khouri | Sept. 4, 1951 |

FOREIGN PATENTS

| Number | Country | Date |
|---|---|---|
| 566,986 | Great Britain | Jan. 23, 1945 |